Figures 1, 2:
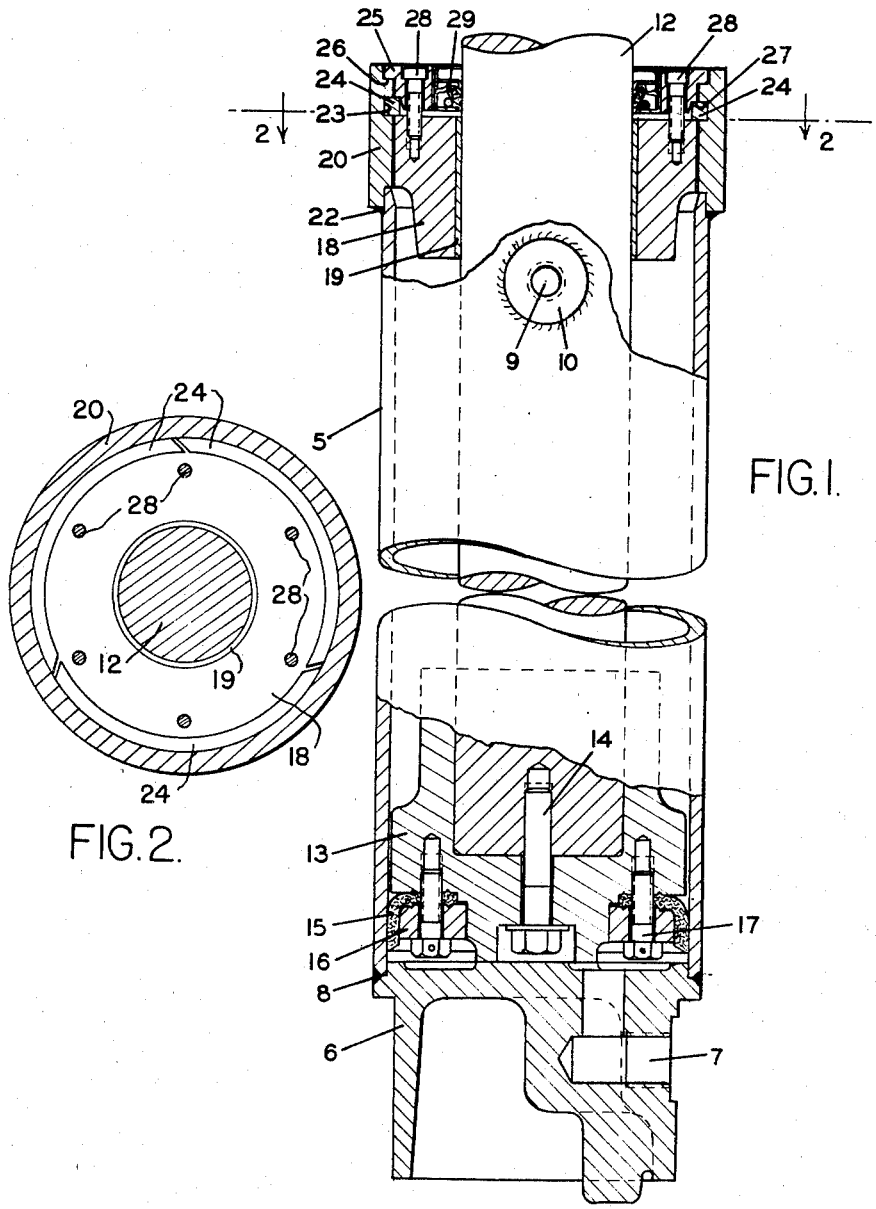

July 24, 1951 L. D. BRONK 2,561,492
CYLINDER CONSTRUCTION
Filed Oct. 27, 1948

INVENTOR.
LELAND D. BRONK
BY Walter E. Schismar
ATTY.

Patented July 24, 1951

2,561,492

UNITED STATES PATENT OFFICE 2,561,492

CYLINDER CONSTRUCTION

Leland D. Bronk, Battle Creek, Mich., assignor to Clark Equipment Company, Buchanan, Mich., a corporation of Michigan Application October 27, 1948, Serial No. 56,879

5 Claims. (Cl. 308—4)

This invention is directed to cylinder constructions and more particularly is concerned with a construction for use in connection with hydraulic cylinders to provide a simplified and economical end closure arrangement for the piston rod end of the cylinder.

In cylinders of the type contemplated by the present invention, it has heretofore been necessary to provide flanged ends on the cylinder to take care of the packing gland, which flanged end had to be welded or otherwise secured to the end of the cylinder, with the packing gland being then bolted in position and requiring a considerable increase in the overall diameter at the end of the cylinder, which, in some cases, was objectionable due to spacial limitations and the like.

The present invention contemplates a cylinder construction in which the end through which the piston rod projects is adapted to be closed by a piston rod guide assembly which is locked in position by a retainer ring which, in turn, seats against a segmental cylinder head ring that holds the guide assembly from axial movement out of the end of the cylinder and yet does not materially increase the diameter at the cylinder end.

It is believed that the particular construction and operation of the device herein disclosed will be more apparent to those skilled in the art from a consideration of the drawing in which Figure 1 is an elevational view, partly in section, and Figure 2 is a detailed sectional view taken on line 2—2 of Figure 1.

Referring in detail to the drawing, the cylinder consists of the sleeve member 5, which, at one end, is provided with the head closure member 6, having the port 7 therein by which fluid under pressure may be introduced into the interior of the cylinder. Preferably, the sleeve and the head member 6 are secured together rigidly by means of an annular ring weld indicated at 8. A suitable outlet for the cylinder is provided by the port 9 carried by a boss member 10 secured on and sealed to the cylinder wall 5.

Disposed within the cylinder is a piston rod 12, having a piston head 13 receiving the end of the rod and secured thereto by means of the stud 14. The head 13 is also adapted to have the annular cup-shaped leather or ring 15, secured thereto for sealing the piston head with respect to the internal cylinder wall, this ring or cup being held in position by the annular member 16 secured to the piston head by means of the studs 17.

At the opposite end of the cylinder, there is provided a piston rod guide assembly consisting of the guide member 18, having the liner or sleeve 19 therein closely embracing the surface of the piston rod 12. The guide member 18 is seated within an annular sleeve member 20, which is welded or otherwise secured as at 22 to the opposite end of the cylinder 5. The member 20 is provided with an annular recess 23 which is adapted to receive, after the guide assembly has been placed in position, a segmental ring preferably composed of three arcuate members which may be made of seamless steel tubing or the like, and which are disposed in the annular recess 23, as indicated at 24. Thus the ring 24 is adapted to hold the guide member 18 from axial outward movement by reason of the abutment of the upper edge of the guide member against the ring, it being noted that the major portion of the cross section of the ring is seated in the recess 23.

To hold the guide in position within the cylinder end, there is provided the retaining ring member 25, which has shouldered portions 26 seating upon an annular shoulder formed in the sleeve member 20 and a second shoulder portion 27 seating upon the upper edge of the ring 24 directly opposite the abutment of the guide member 18 with the ring. A suitable series of circumferentially spaced studs or bolts 28 are recessed into the ring 25 and, in turn, thread into the guide member 18 to lock it in position and thereby clamp the retaining ring 25 and the guide member 18 tightly together against opposite sides of the segmental ring 24.

A suitable oil seal 29 is preferably pressed in and retained within the open bore of the ring 25, engaging the piston rod for preventing oil from leaking therepast.

It will be apparent from the construction thus far described that by the use of the sleeve member 20 at one end of the cylinder carrying the rings 24 therein, which are so disposed as to provide an abutment between the guide member 18 and the retainer ring 25, the entire end of the cylinder is sealed effectively without materially increasing its radial extent, thereby allowing its use in those situations where a flange type end gland could not be employed.

I am aware that various changes may be made in certain details of the present construction, and I therefore do not intend to be limited except as defined by the scope and spirit of the appended claims.

I claim:

1. In combination, a tubular sleeve having a piston and piston rod therein, an annular member piloted on and having one end rigidly secured to one end of said sleeve, a bushing confined radially within said member and forming a guide for said rod, an annular groove in said member, a ring partially seated in said groove and overlying the outer end of said bushing, retainer means engaging said bushing and seated in said member to hold said bushing against said ring, a radial shoulder in the outer end of said annular member, and a flange on said retaining means engaging said shoulder preventing inward movement of said retainer means.

2. Guide bearing means for the end of a cylinder having a piston rod extending therethrough, comprising an annular member fixed on the end of the cylinder and having an annular inwardly opening groove therein, a ring partially seated in said groove, a bushing about the piston rod having its outer end engaged by said ring, a retainer seated on the outer end of said member and shouldered on the outer face of said ring, and clamp means between said retainer and said bushing for drawing them axially against the projecting portion of said ring.

3. Guide bearing means for a cylinder end having a piston rod extending axially therethrough comprising an annular member fixed on the end of said cylinder and having an internal annular groove and an axially spaced annular shoulder, a ring partially seated in said groove and projecting radially inwardly, a bushing forming a guide for said rod and abutting axially against the radial underface of the projecting part of said ring, a retainer seated axially on said shoulder having an abutment portion engaging the radial outer face of said ring, and clamp means for drawing said bushing and retainer axially toward each other to clamp them about the projecting portion of said ring.

4. The guide bearing means of claim 3 wherein said ring is formed of a plurality of segments.

5. Guide bearing means for a cylinder end having a piston rod extending axially therethrough comprising an annular member fixed on the end of said cylinder and having an internal annular groove therein, a bushing forming a guide for said rod and fitting in said member axially inwardly of said groove, a retainer fitting in the open end of said annular member, a ring seated partially in said groove and projecting inwardly between said bushing and retainer, and means for drawing said bushing and retainer toward each other to clamp them against the opposite projecting faces of said ring.

LELAND D. BRONK.

REFERENCES CITED

The following references are of record in the file of this patent:

UNITED STATES PATENTS

| Number | Name | Date |
| --- | --- | --- |
| 719,367 | Prescott | Jan. 25, 1903 |
| 738,503 | Water | Sept. 8, 1903 |
| 1,083,454 | McClelland | Jan. 6, 1914 |
| 1,551,706 | Spear | Sept. 1, 1925 |